May 28, 1957
J. L. RENNICK
2,793,560
COLOR ANALYZER
Filed March 10, 1953
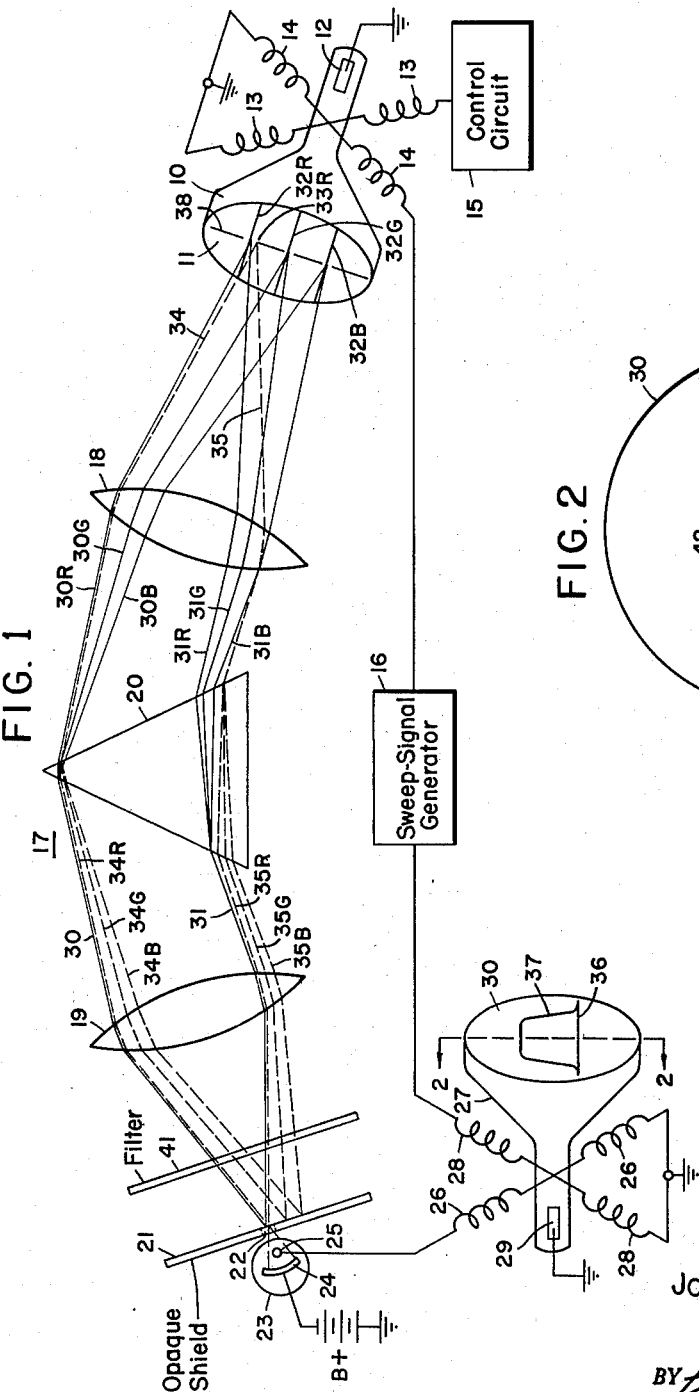
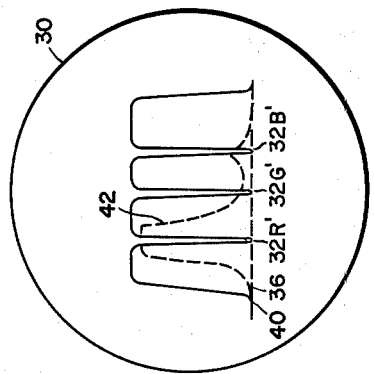
JOHN L. RENNICK
INVENTOR.
BY Francis W. Crotty
HIS ATTORNEY United States Patent Office 2,793,560
Patented May 28, 1957

2,793,560

COLOR ANALYZER

John L. Rennick, Elmwood Park, Ill., assignor to Zenith Radio Corporation, a corporation of Illinois Application March 10, 1953, Serial No. 341,544

2 Claims. (Cl. 88—14)

This invention pertains to a new and improved color analyzer for determining the chromatic characteristics of various types of materials and is particularly directed to a color analyzer suitable for manufacturing test purposes.

Highly specialized equipment has been designed and constructed for experimental laboratory use in determining the color characteristics of materials used as color filters and reflectors in the photographic and color-television fields. However, this equipment is usually quite expensive, and, in most instances, requires a considerable degree of judgment and skill on the part of the operator or technician using the equipment. The mass production of equipment utilizing elements having requisite color transmission or reflection characteristics, gives rise to a definite need for a color analyzer which may be operated by relatively unskilled personnel and which provides a reasonably accurate indication of the color characteristics of those elements.

It is an object of this invention, therefore, to provide a new and improved color analyzer for efficiently and rapidly determining the spectral response of a filter or reflector.

It is an additional object of the invention to provide a color analyzer which reduces the skill and judgment required of an operator to a minimum and which completely eliminates any requirement for judgment with respect to color.

It is a corollary object of the invention to provide a color analyzer which is relatively simple and expedient to construct and economical to manufacture.

The invention relates to a system for analyzing the chromatic characteristics of a color-selective element and includes a light source movable along a predetermined path and photo-sensitive means for developing a control signal representative of the intensity of light impinging thereon. Means is provided to direct light from the source to impinge upon a light-translating dispersion device included within an optical system, a selected portion of the light translated by the dispersion device being caused to impinge upon the photo-sensitive means. A plurality of opaque indicia, each of a sufficient width to block at least a portion of the light from the source, are interposed between the light source path and the dispersion device and are spaced in a direction along the path for obstructing the light during predetermined intervals of its travel. An indicating device is coupled to the photo-sensitive means for developing a visual representation of the control signal. Finally, co-ordinating means, intercoupling the light moving means and the indicating device, correlate the visual representation with the instantaneous position of the light source. As a result, a visual representation is obtained of the chromatic characteristics of the color selective element when the latter is disposed in light intercepting position between the light source and the photo-sensitive means.

The features of the invention which are believed to be novel are set forth with particularity in the appended claims. The organization and manner of operation of the invention, together with further objects and advantages thereof, may best be understood by reference to the following description taken in conjunction with the accompanying drawings, in which:

Figure 1 is a schematic diagram of a color analyzer constructed in accordance with the invention; and Figure 2 illustrates a portion of the apparatus of Figure 1 as seen along line 2—2.

The color analyzer shown in Figure 1 comprises a cathode-ray tube 10 including a luminescent screen 11 and an electron gun 12. Two sets of deflection coils 13 and 14 in space quadrature with respect to each other are operatively associated with tube 10; deflection coils 13 are coupled to a control circuit 15, whereas coils 14 are connected to a sweep-signal generator 16. The color analyzer also includes an optical system 17 schematically represented as including a pair of lenses or light-directing means 18 and 19 and a light-translating dispersion device such as a prism 20. Lenses 18 and 19 may comprise any suitable light-directing means including simple or compound lens structures, whereas prism 20 may comprise any suitable simple or compound prism structure or other dispersion medium or, if preferred, a diffraction grating. In this connection, it should be noted that the term "dispersion device," as used throughout this specification and the ensuing claims, refers to any suitable device for separating a composite light wave into its spectral components. Optical system 17 also includes a masking structure 21 having an aperture 22 suitably aligned with lens 19, as is more completely described hereinafter.

A photo-cell 23 is positioned adjacent to aperture 22 to receive light translated therethrough; cell 23 includes a photo-sensitive cathode 24, coupled to ground through a source of operating potential B+, and an anode 25. Anode 25 is connected to one pair of deflection coils 26 operatively associated with a cathode-ray tube indicating device 27. A second pair of deflection coils 28 are associated with device 27 in space quadrature with coils 26 and are coupled to sweep-signal generator 16. Device 27 also includes a suitable electron gun 29 and a luminescent screen 30. Deflection coils 26 and 28, as well as coils 13 and 14, may be of any known type, and, if preferred, may be supplanted by suitable electrostatic deflection elements. The usual biasing and accelerating potential sources for guns 12 and 29 and screens 11 and 30 have been omitted from the drawing solely for simplification and clarification.

Before the apparatus shown in Figure 1 may be used effectively, it is necessary to adjust or calibrate it. For calibration purposes, a substantially single-point light source (not shown) is mounted behind aperture 22, replacing photo-cell 23. Light from a suitable source mounted in this position is focused by lens 19 on one face of prism 20, as generally illustrated by lines 30 and 31. As this light is translated through the prism, it is segregated into its various spectral components, several of which are indicated by lines 30R, 30G, 30B, 31R, 31G and 31B, the letter suffixes R, G, and B referring to red, green and blue (or violet) portions of the spectrum, respectively. The spectral components are focused, by means of lens 18, upon screen 11 of cathode-ray tube 10; it will be understood that in practice a continuous spectrum is displayed across the screen. Opaque indicia markings or lines are then formed upon the face of screen 11 at locations corresponding to selected spectral bands; such lines are indicated as 32R, 32G and 32B corresponding to the primary color components. After device 10 is calibrated, the light source temporarily installed at aperture 22 is removed and the photo-cell 23 is again installed in the position shown.

When the color analyzer is placed in operation, cathode-ray tube 10 is energized so that electron gun 12 develops an electron beam and projects that beam upon screen 11. The electron beam excites a portion of the screen and causes it to emit light in well known fashion; the point at which the electron beam strikes the screen becomes the light source of the color analyzer. Assuming that point 33R on screen 11 is momentarily excited, the light emitted therefrom is focused upon prism 20 by lens 18, the path of this light being indicated by dash lines 34 and 35. As the light passes through prism 20, it is dispersed and the primary spectral components emerge along paths 34R, 34G, 34B and 35R, 35G, 35B. After translation through prism 20, the separated spectral components are focused upon masking structure 21 by lens 19. It should be noted that with the assumed point of origin of the light from luminescent screen 10, only the red portion of the light translated through prism 20 impinges upon aperture 22; this is to be expected, since only the red component of a composite light wave emanating from aperture 22 during the calibration procedure was able to reach point 33R on screen 11. The red portion of the light originating at point 33R, after passing through aperture 22, strikes photo-cell 23 and causes a current flow between anode 25 and cathode 24 representative of the intensity of the light impinging upon the photo-cell.

Indicating device 27 is energized at the same time as lighting device 10, so that electron gun 29 develops a beam of electrons and projects that beam toward screen 30. In the absence of any deflection field, the beam from gun 29 would ordinarily impinge upon the center of screen 30 and would remain motionless in that position. However, a suitable signal from sweep generator 16 is applied to coils 28 to deflect the beam periodically across screen 30 in a horizontal line 36. In addition, the current flowing between anode 25 and cathode 24 of photo-cell 23 is directed through coils 26, giving rise to a vertical displacement of at least a portion of the image formed on screen 30, as indicated by line 37. The deflection control signal applied to coils 28 is also supplied to coils 14 to deflect the beam generated by electron gun 12 so that the light source formed on screen 11 moves back and forth across indicia lines 32. The position of the light source formed on screen 11 by the electron beam developed in device 10 is further controlled by signals applied from circuit 15 to coils 13; for the embodiment shown, circuit 15 comprises a simple biasing source and is used primarily to control the beam so that its path of movement is substantially restricted to a line 38 perpendicularly intersecting the centers of indicia lines 32. As the light source moves along line 38, the spectral portion of the light from device 10 which reaches aperture 22 varies in accordance with the position of the light source on screen 11. Thus, when the light source approaches indicia line 32G, only the green spectral components of the light emanating from screen 11 pass through optical system 17 and reach aperture 22; similarly, when the light source approaches line 32B, only the blue portion of light emitted from screen 11 is focused upon the aperture. Photo-cell 23 is preferably of the type having a substantially uniform response characteristic throughout the visible spectrum, in order to provide an output signal whose amplitude is dependent only on the intensity of the incident light.

With sweep-signal generator 16 maintaining the movements of the cathode-ray beams of devices 10 and 27 in synchronism, the image developed on screen 30 of indicating device 27 is of the form illustrated in solid outline in Figure 2. As seen therein, the image starts at a point 40 on line 36 corresponding to the extremity of line 38 on device 10 beyond index line 32R (Figure 1). As the light source moves across screen 11, following line 38, it almost immediately reaches a point where some light will be translated through system 17 to impinge upon photo-cell 23; the photo-cell develops a control signal representative of the intensity of the light impinging thereon and applies that control signal to deflection coils 26. The electron beam of device 27 is deflected in accordance with the field developed by coils 26, causing a vertical deflection of the beam, and an image (Figure 2) similar to image line 37 is formed on screen 30. However, the image is now interrupted in a clearly distinguishable manner at three points 32R', 32G' and 32B' corresponding to index lines 32R, 32G, and 32B on device 10. The discontinuities or markers 32R', 32G' and 32B' result from the fact that opaque index lines 32 block off or mask the light source momentarily as it travels along line 38 and, during the intervals in which the light source is so masked, photo-cell 23 is not illuminated and therefore provides no control or deflection signal to coils 26. The deflection field normally created by coils 26 being absent, the beam from gun 29 momentarily returns to base line 36 as indicated.

In order to test a light-filtering element or material, it is only necessary to insert the filter or a sample of the material into optical system 17 at some point between the light source and aperture 22. By way of example, a red color filter 41 is shown interposed between lens 19 and aperture 22. Assuming that filter 41 translates only a narrow band of light in the red portion of the spectrum, the image formed on screen 30 is illustrated by dash line 42 in Figure 2. A filter of this type, which blocks off or absorbs the blue and green portions of the spectrum, permits only red light to reach photo-cell 23. The width of the peaked image represented by line 42 depends upon the band-pass characteristics of filter 41; furthermore, orientation of the image with respect to marker 32R' depends upon the correspondence of the filter characteristics to the particular color originally selected for index line 32R. Consequently, the image upon screen 30 may be shifted to the right or left as filters of different characteristics are tested. The operator of the color analyzer, however, is not required to make a subjective analysis of the color or quality of light passed by filter 41, but may determine the characteristics of that filter qualitatively by observing the width of image 42 and its position with respect to markers 32R', 32G' and 32B'. In addition, the height or vertical displacement of image 42 provides an indication of the efficiency of filter 41 in translating light in the red portion of the spectrum. The images illustrated in solid outline and in dashed outline 42 in Figure 2 represent different operating conditions of the color analyzer and do not indicate a simultaneous presentation on the viewing surface of the indicating device.

It will be obvious to those skilled in the art that operation of the color analyzer is almost completely independent of the position in optical system 17 into which filter 41 is inserted. Furthermore, the analyzer may readily be adapted for use in checking color-selective reflectors by replacing mask 21 with a suitable reflector having a substantially flat color-reflection characteristic. Mask 21 and photo-cell 23 are then positioned to receive light reflected therefrom. The apparatus is calibrated as before and the flat-characteristic mirror is replaced by a reflecting element to be tested, the remainder of the test procedure being the same in all material respects as that outlined above.

While a particular embodiment of the present invention has been shown and described, it is apparent that changes and modifications may be made without departing from the invention in its broader aspects. The aim of the appended claims, therefore, is to cover all such changes and modifications as fall within the true spirit and scope of the invention.

I claim:

1. A system for analyzing the chromatic characteristics of a color-selective element comprising: a light-developing device comprising a cathode-ray tube, having a luminescent screen on which are formed a plurality of opaque indicia, and an associated deflection system for deflecting the electron-beam of said tube in a predetermined manner to develop a light source which moves across said screen along a predetermined path intersecting said indicia; photo-sensitive means for developing a control signal representative of the intensity of light impinging thereon; an optical system including a light-translating dispersion device, means for directing light from said source to impinge upon said device, and means for directing a selected portion of light translated by said dispersion device to impinge upon said photo-sensitive means; an indicating device, coupled to said photo-sensitive means, for developing a visual representation of said control signal; and co-ordinating means, intercoupling said deflection system and said indicating device, for correlating said visual representation with the instantaneous position of said light source on said path, whereby a visual representation is obtained of the chromatic characteristic of said color-selective element when disposed in light intercepting position between said light source and said photo-sensitive means.

2. A system for analyzing the chromatic characteristics of a color selective element comprising: a light source; means for moving said light source along a predetermined path; photo-sensitive means for developing a control signal representative of the intensity of light impinging thereon; an optical system, including a light-translating dispersion device; means for directing light from said source to impinge upon said device, and means for directing a selected portion of light translated by said dispersion device to impinge upon said photo-sensitive means; a plurality of opaque indicia, each of sufficient width to block at least a portion of said light from said source, interposed between said light source path and said dispersion device and spaced in a direction along said path for obstructing light from said source during predetermined intervals of its travel; an indicating device, coupled to said photo-sensitive means, for developing a visual representation of said control signal; and co-ordinating means, intercoupling said light-moving means and said indicating device, for correlating said visual representation with the instantaneous position of said light source on said path, whereby a visual representation is obtained of the chromatic characteristics of said color-selective element when disposed in light intercepting position between said light source and said photo-sensitive means.

References Cited in the file of this patent

UNITED STATES PATENTS

| | | |
|---|---|---|
| 1,806,198 | Hardy | May 19, 1931 |
| 1,960,097 | Barnard et al. | May 22, 1934 |
| 2,046,958 | Marvin | July 7, 1936 |
| 2,602,368 | Barnes | July 8, 1952 |
| 2,631,489 | Golay | Mar. 17, 1953 |
| 2,645,971 | Herbst | July 21, 1953 |

FOREIGN PATENTS

| | | |
|---|---|---|
| 643,396 | Great Britain | Sept. 20, 1950 |